United States Patent [19]
Glauning

[11] Patent Number: 6,087,744
[45] Date of Patent: Jul. 11, 2000

[54] ELECTRICAL MACHINE

[75] Inventor: Juergen Glauning, Steinheim, Germany

[73] Assignee: Robert Bosch GmbH, Stuttgart, Germany

[21] Appl. No.: 09/131,830

[22] Filed: Aug. 11, 1998

[30] Foreign Application Priority Data

Aug. 26, 1997 [DE] Germany .............. 197 37 103
Mar. 11, 1998 [DE] Germany .............. 198 10 437

[51] Int. Cl.[7] ................................ H02K 9/00
[52] U.S. Cl. ................................ 310/58; 310/61
[58] Field of Search .................... 310/52, 58, 54, 310/89, 61

[56] References Cited

U.S. PATENT DOCUMENTS

| | | | |
|---|---|---|---|
| 3,558,943 | 1/1971 | Nilsson | 310/58 |
| 4,190,780 | 2/1980 | Whiteley | 310/59 |
| 4,365,178 | 12/1982 | Lenz | 310/61 |
| 4,739,204 | 4/1988 | Kitamura et al. | 310/68 D |
| 4,765,283 | 8/1988 | Kitamura et al. | 123/41.31 |
| 4,908,537 | 3/1990 | Sismour, Jr. | 310/51 |
| 4,922,148 | 5/1990 | Kitamura | 310/68 D |
| 4,958,095 | 9/1990 | Uchida et al. | 310/59 |
| 5,271,248 | 12/1993 | Crowe | 62/505 |
| 5,530,305 | 6/1996 | Krueger et al. | 310/74 |
| 5,655,485 | 8/1997 | Kusase et al. | 123/41.31 |
| 5,836,270 | 11/1998 | Aoki et al. | 123/41.31 |
| 5,859,482 | 1/1999 | Crowell et al. | |

*Primary Examiner*—Nestor Ramirez
*Assistant Examiner*—Joseph Waks
*Attorney, Agent, or Firm*—Michael J. Striker

[57] ABSTRACT

An electrical machine for starting an internal combustion engine and/or for voltage supply of a vehicle electrical system of a motor vehicle has a housing, a stator mounted on the housing, a claw pole rotor system, a separable operative connection with an internal combustion engine, and separate circulations with different cooling media for the stator and the rotor.

6 Claims, 5 Drawing Sheets

6,087,744

ELECTRICAL MACHINE

BACKGROUND OF THE INVENTION

The present invention relates to electrical machines.

It is known to use electrical machines, in particular three phase current generators for energy supply of a vehicle electrical system in motor vehicles. Claw pole generators are used for this purpose. They are very light and powerful and therefore are cost favorable. Embodiments with a single flow axial ventilation by an outwardly located fans are known.

In addition, so-called compact generators are used, which have two flow ventilations by means of two small inwardly located fans. The cooling air is aspirated axially and leaves the generator radially in the region of its stator winding head in a drive and collector ring shield. In order to guarantee an effective generator cooling in the case of high motor chamber temperatures, additional devices for fresh air aspiration are known.

The intensity of the cooling must be designed so that the temperature of the components of the generator do not exceed specific limits under all occurring border conditions. Conventional complete encapsulation against dust, dirt, and spraying water in utility vehicle generators increases the problems of the required heat withdrawal. Furthermore, closed generators are known with cooling ribs for surface cooling, as well close generator with liquid cooling, for example oil.

SUMMARY OF THE INVENTION

Accordingly, it is an object of present invention to provide an electrical machine, which, due to separate cooling circulation for a stator and for a rotor makes possible an independent cooling of the component.

In particular with the use of different cooling media for stator and rotor, for example water and air, an independent cooling as well as an optimization of a preferable cooling medium passage with respect to a temperature load can be provided. The cooling circulations which are independent from one another can be varied with respect to their volumes streams and optimized.

In accordance with a preferable embodiment of the invention, the cooling circulation, when operational temperature of the electrical machine is reached, can be switched off individually and independently from one another. It is advantageous when the stator has a cooling jacket which is joined with an inner surface in a substantially cylindrical housing of the electrical machine and has at least one ring-shaped cooling passage. In order to guarantee a large-surface and effective cooling, it is however advantageous to extend the cooling passage over a great surface of the cooling jacket, for example meander-or spiral shaped in a peripheral direction of the housing. Also, several cooling passages can be provided in the cooling jacket which for example are connected with one another by passages and/or separated from one another by webs.

The inventive so-called hybrid cooling of the electrical machine can be coupled in an advantageous manner with a liquid cooling circulation of the internal combustion engine. Preferably, a separating valve which is operating electrically or in another manner can be provided. It is also possible to provide a cooling circulation for electrical machines which is independent from the cooling circulation of the internal combustion engine. For circulation of the cooling liquid, mechanically or electrically operated pump can be used. The circulation can be also performed by heating, or in other words in accordance with the thermo siphone principle. For this purpose no special pump is needed.

The cooling circulation of the rotor of the electrical machine is operated for example with air as a cooling medium, since no insulation problems with respect to flow-guiding components must be taken into consideration. In a preferable embodiment, the rotor has a central opening, through which the air can flow, and also several transverse openings through which the air can flow radially outwardly and circulate through several openings in the electrical machine.

In accordance with an especially advantageous embodiment of the present invention, the design of the air-guiding element can provide a suction action of the circulating air, which is supported by a central positive guiding element which closes the hollow openings of the rotor. Furthermore, it can be advantageous when an impulse wheel or an impeller with several vanes is provided, which supports the air circulation as a further positive guiding element (air guiding plate turbine). It is advantageous when the airflow passes over a winding head of the electrical machine and thereby can be used especially at high rotary speed for an effective cooling.

In a preferable embodiment, a cooling of air which passes through the water-cooled housing is guaranteed by corresponding air guides, and thereby an effective heat exchange of the cooling media with one another is obtained. The air circulation can be both closed, or partially or completely open, or in other words provided with permanent air supply from outside. In an open air circulation, it is advantageous to provide withdrawal of wear products of the friction coating of a dry coupling of the motor vehicle. The openings located in the housing for the flowing out air can be both arranged at an end side axially as well as also at the peripheral side radially. In a preferable modification of the invention, all or several openings can be guided in the housing also as longitudinal openings, such as slots or longitudinal slots.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
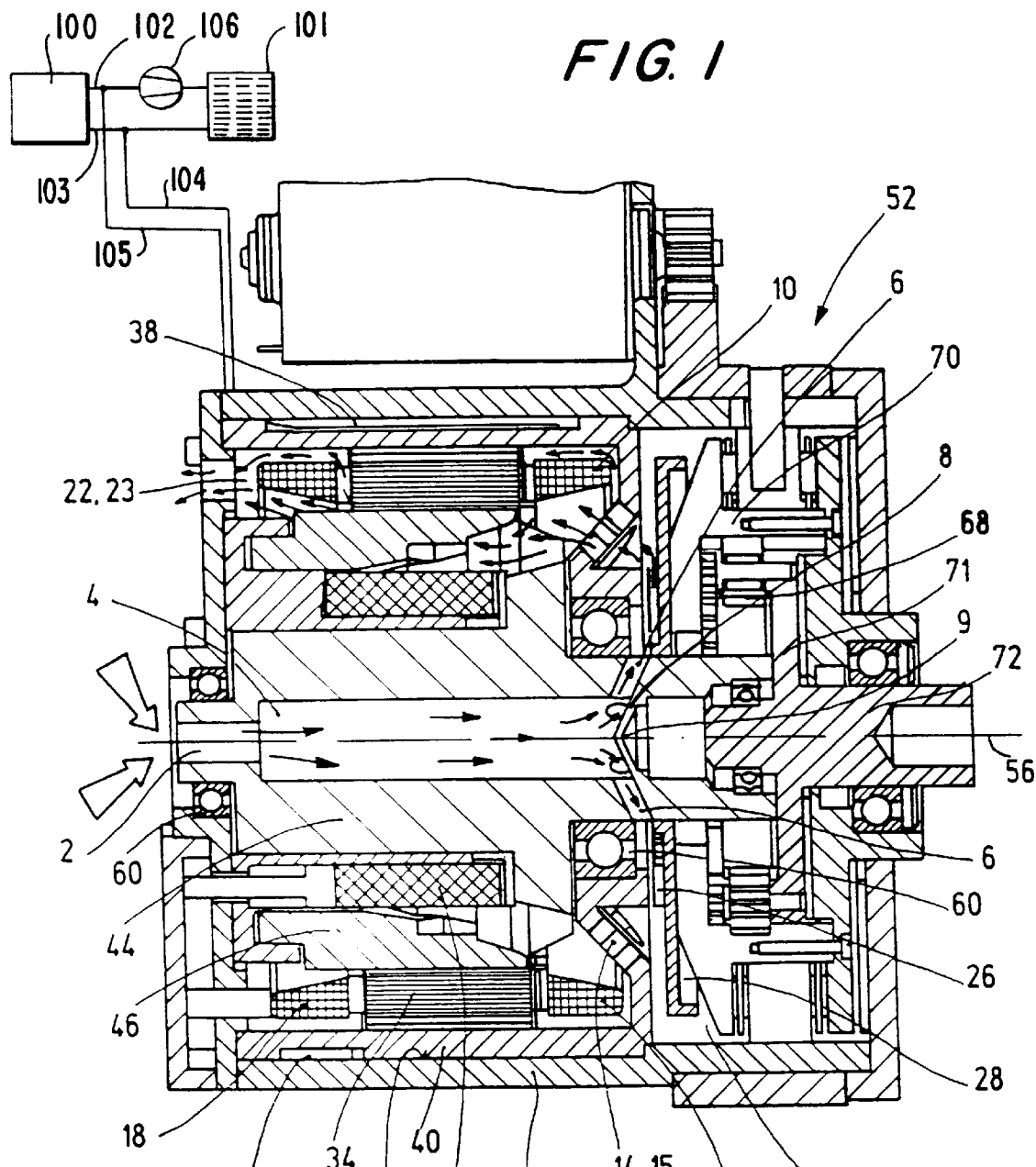
FIG. 1 is a view showing the schematic section of an electrical machine operatively connected with a transmission.

FIG. 1 shows a schematic cross-section of an electrical machine 1. The Figure schematically shows an internal combustion engine 100, a radiator 101, and two conduits 102, 103 for feeding fluid from the engine 10 in the radiator 101 and back again. Cooling fluid for the electrical machine 1 is tapped form the conduit 103 by a tube 104 and fed back to a pump 106 by a tube 105. The electrical machine 1 is operatively connected with a transmission. The transmission in a shown embodiment is a planetary transmission 52. The reduction ratio of the electrical machine 1 relative to a drive train of a motor vehicle is varied in two stages. The electrical machine 1 in the shown embodiment, a three phase electrical machine. It has a stator 34 with two winding heads 10 and 18 and a rotor 44 which is inoperative connection with the planetary transmission 52. The stator 34 is surrounded by a cooling jacket 40.

The cooling jacket 4 which is substantially cylindrical is connected with an inner surface 45 of a substantially cylindrical housing 36. The cooling jacket 40 has one or several ring-shaped or meander-shaped grooves which operate as cooling passages 38. Due to the resulting great contacting surface of the cooling jacket 40 with the housing 30, a good heat transfer from the stator 34 to the cooling jacket 40 and thereby to the housing 36 is guaranteed. During rinsing of the cooling passage 38 with a cooling medium 32, for example with water, a good heat withdrawal is obtained. The substantial heat generation produced in the electrical machine 1 during operation with high load can be transferred from the stator 34 to the housing 36 and then withdrawn fast by the cooling medium 32.

The cooling medium 32 can enter through a not shown inlet opening in the ring-shaped or meander-shaped cooling passage 38, and then flow through it through the whole periphery of the cooling jacket 40. The cooling medium 32 takes a heat energy and can exit through a not shown outlet opening. Because of the large-surface connection and a good thermal transition between the stator 34 and the cooling jacket 40, the stator 34 and thereby the electrical machine 1 are cooled very effectively. The heat transfer between the stator 34 and the cooling jacket 40 can be further improved by a good throughflow with the cooling medium 32, which can be obtained by branching into several cooling passages, for example by a web. The cooling medium 32 can be circulated by a separate pump provided for this purpose. It is also possible to conduct a circulation based on a thermosiphon principle so that no separate pump is needed.

In accordance with a further variant of the invention, the connection to the cooling system, in particular the cooling circulation of the internal combustion engine is provided. It should be mentioned that with an operational temperature of the internal combustion engine, the temperatures in the cooling medium 32 are substantially higher than in the case of the separate cooling circulation.

It can be seen that the rotor 44 is rotatably supported in two ball bearings which together with a claw pole 46 and two windings heads 10 and 18 form the electrical machine 1. It further can be seen that the shaft end of the rotor 44 which is located at the right side in FIG. 1 is formed as a central sun gear 66 for a planetary transmission 52 provided with a plurality of planetary gears 68. The planetary gears are rotatably supported on a planetary carrier 71 which, together with driven shafts 72 of the planetary transmission 52 form a structural assembly. The planetary gears 68 engage with a hollow gear 70 which is fixed relative to the housing 36 or relative the planetary carrier 71. Thereby both particles reduction stages of the planetary transmission can be produced.

The rotor 44 is provided with a central opening 2 at the left shaft end in FIG. 1. The central opening 2 opens into a hollow opening 4 of a greater diameter and provides a throughflow with cooling air. The air which flows in the opening 2 flows through the rotor 44 through the hollow opening 4 over its whole length and can flow out through at least two transverse openings 6 directly outside of the right ball bearing 60, radially outwardly into a supply chamber 54 between the transmission 52 and the electrical machine 1. The at least two, preferably more, transfers opening 6 are arranged not exactly perpendicular to the rotary axis 56 of the rotor 44. Instead for better air guidance they are slightly inclined outwardly in direction of the shaft end of the rotor 44.

The transverse openings, in addition to the air guidance, performs simultaneously the function of a turbine, with the peripheral speed of the outer diameter greater than the peripheral speed at the inner diameter. For this purpose, thereby a suction, in particular a negative pressure, can be obtained, which transports the air from the core of the rotor 44 or in other words from the hollow opening 4. This action is supported by an angularly shaped positive guiding element. In the shown embodiment it is formed by a conical closing plug 8 whose conical tip 9 coincides with the rotary axis 56 of the rotor 44. The closing plug 8 closes thereby the hollow opening 4 at the side of the rotor 44 which is opposite to the opening 2, and forces the air which flows in the opening 2 to flow out through the transverse openings 6.

The air which is located in the supply chamber 54 is further guided through several openings 14 or a longitudinal slots 15, which guide the air in direction of an air gap between the rotor 44 and the stator 34. The air passes over the winding head 10 at the drive side and can take the heat. Simultaneously, it is cooled by passing over the water-cooled housing 46, before it is guided through the air gap between the rotor 44 and the stator 34, as well as through the claw pole 46 and an excitation winding 16 toward the winding head 18. Therefore the above mentioned elements are cooled.

When the air passes the water-cooled housing 36, it takes the heat with it and is cooled. The air can flow out from the electrical machine 1 through several openings 22 or longitudinal slots 23 arranged at the end side of the housing 36. A part of the flowing out air is again aspirated trough the opening 2 as a fresh air. Thereby a partially closed circulation is produced.

Figure 2:
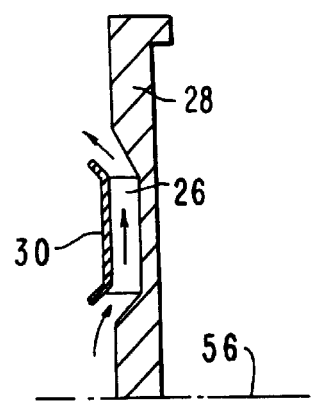
FIG. 2 is a section of a part of the machine shown in FIG. 1.

FIG. 2 shows an impulse wheel 28 or an impeller in a detailed cross-section corresponding to FIG. 1. It is formed as a flat disk and fixed immediately adjoining the outflow openings in the radial transverse openings 6 on the shaft in the rotor 44. Thereby the deviation of the airflow from the transverse openings 6 into the openings 14 or into the slot 15 is supported. It flows from a direction coaxial to the rotary axis 56, to a passing flow on the air gap between the rotor 44 and the stator 34 with a deviation around 180°.

The impulse wheel 28 has several vanes 26 provided on a flat side which faces the electrical machine 1. It also has an air guiding plate 30 located perpendicular to its end. The ring-shaped air guiding plate 30 with a contour curved at the inner and outer edges of the ring is located with its flat side parallel to the flat side of the impulse wheel 26 or perpendicular to the rotary axis 56. The impulse wheel acts together with the vanes 26 and the air guiding plate 30 as a turbine and operates for supporting the suction action of the air from the transverse openings 6.

Figure 3:
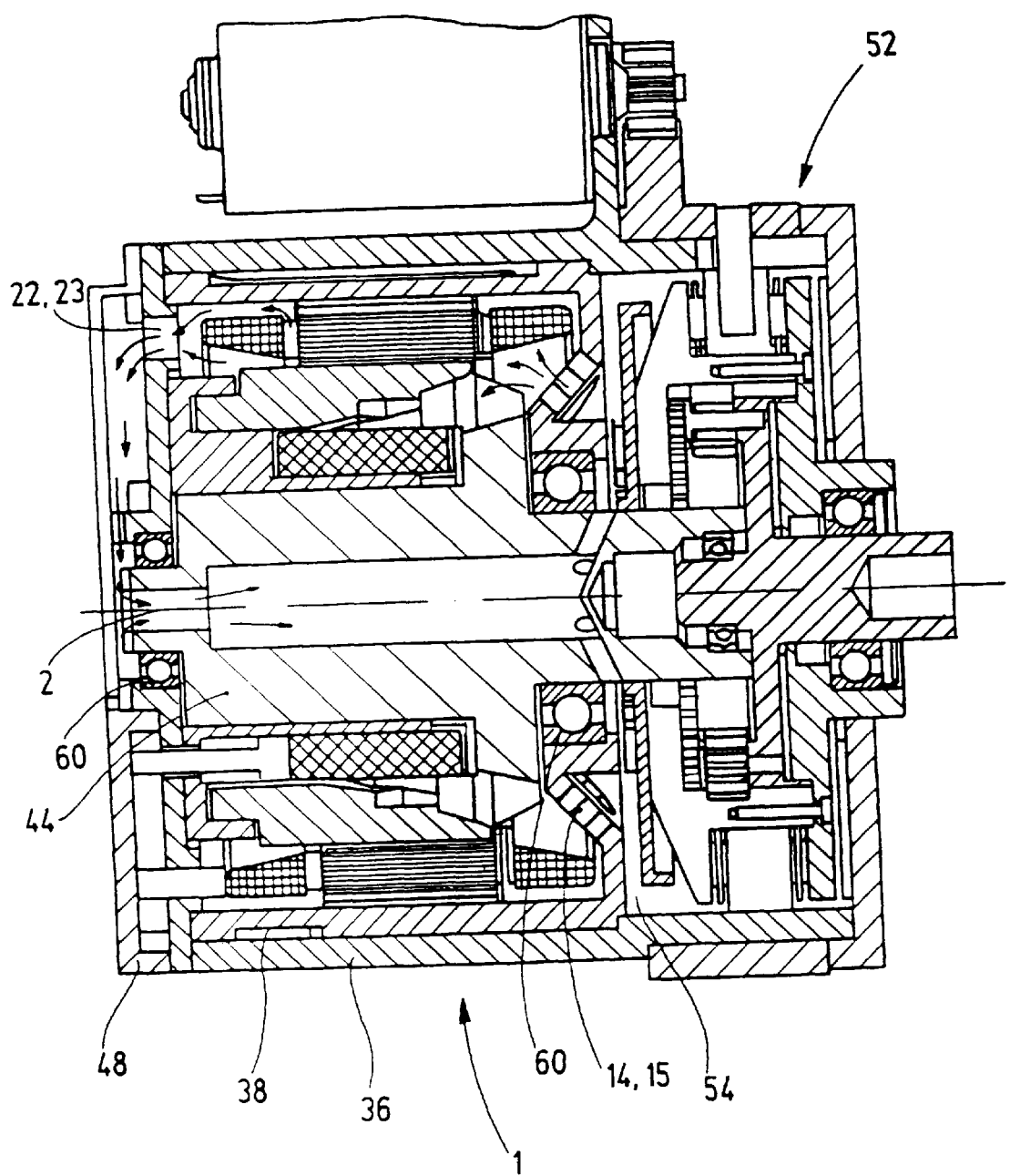
FIG. 3 is a schematic section of a modified embodiment of the electrical machine of FIG. 1.

FIG. 3 shows a further cross-section of a modified embodiment of the hybrid-cooled electrical machine 1. The parts which are similar to the parts of the previous figures are identified with the same reference numerals and not illustrated in detail. In contrast to the embodiment of FIG. 1, a cover 48 is provided at the end side at the left on the housing 36, or in other words at the same side as the opening 2. The cover 48 prevents the flow out of the air outwardly and thereby serves for a closed circulation of the air. The air which exits the openings 22 or the longitudinal slots 23 can enter the opening 2 again. A greater part of the heat which is taken by the cooling air is transported through the liquid cooling medium 32 outwardly.

Figure 4:
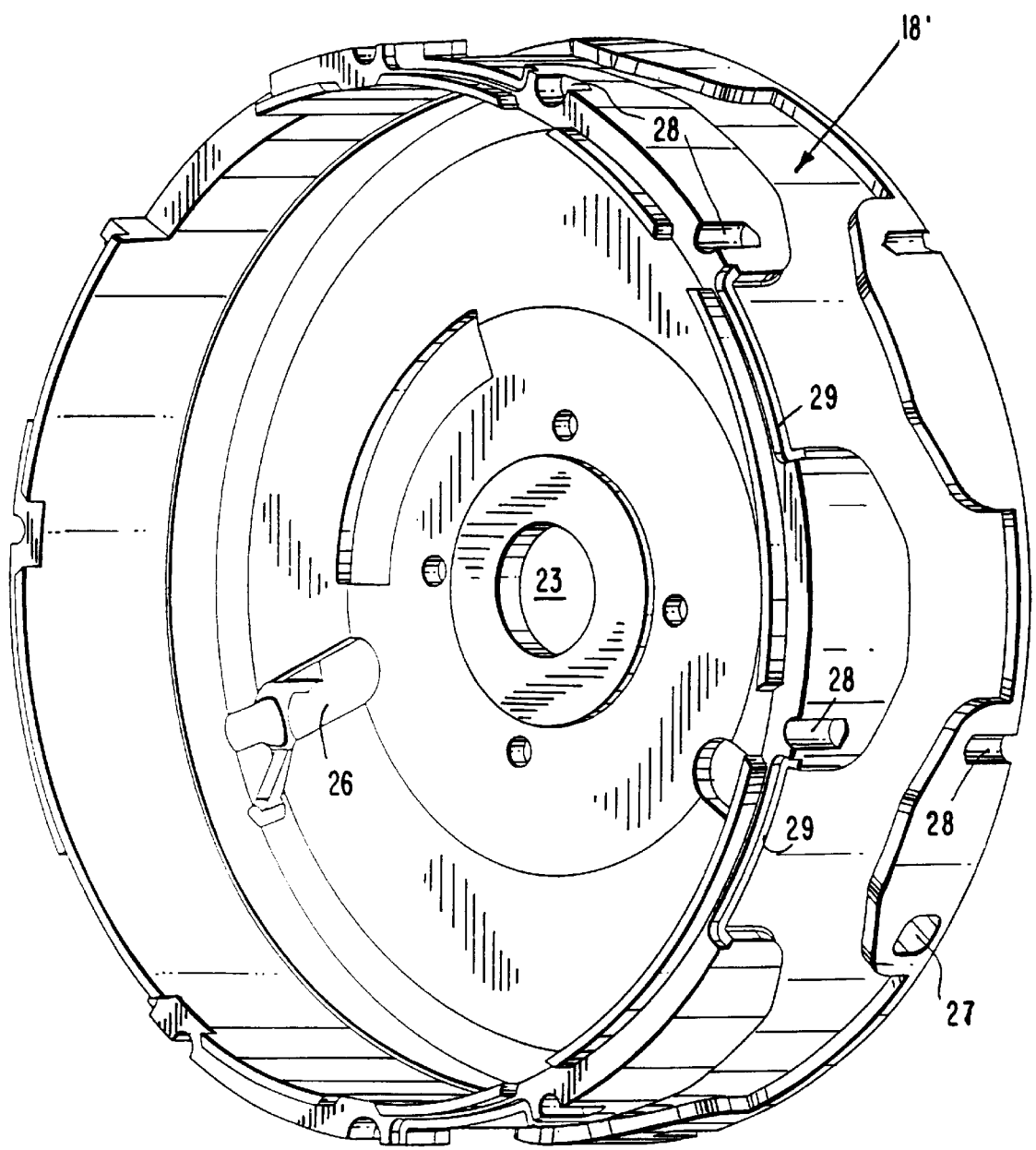
FIG. 4 is a perspective view of a cooling jacket of the inventive electrical machine.

Some modifications of the inventive electrical machine are shown in FIGS. 4–7. FIG. 4 is a perspective view of the cooling jacket which substantially corresponds to the cooling jacket 40, and has a meander-shaped cooling passage 18'.

Figure 5:
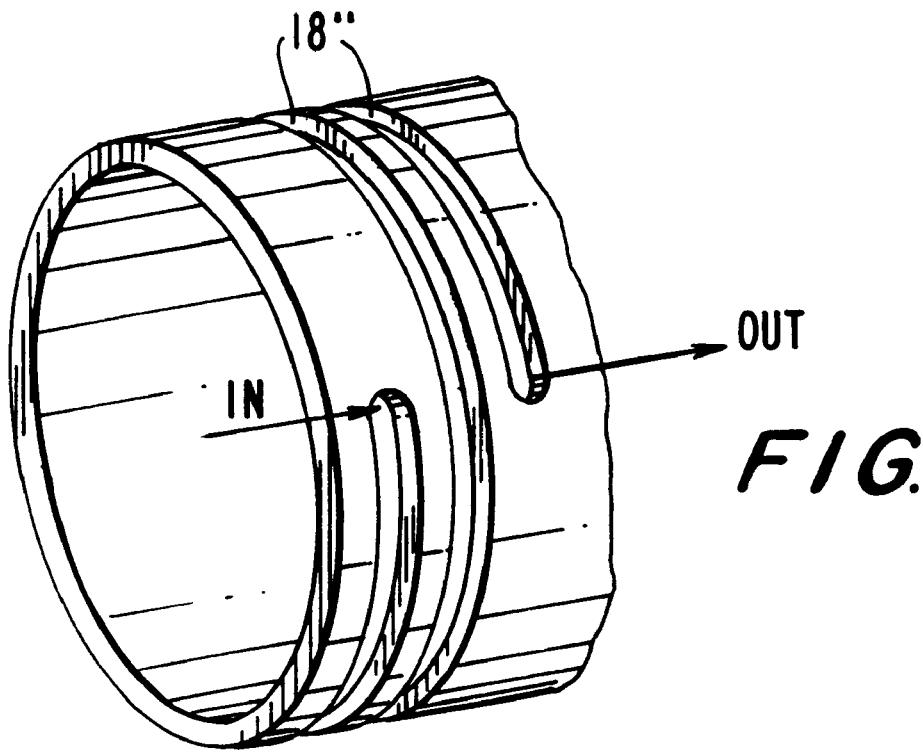
FIG. 5 is a view showing the cooling jacket in accordance with another embodiment of the present invention.

FIG. 5 shows a cooling jacket which has a spiral-shaped cooling passage 18". In the shown example, the cooling passage extends twice around the circumference of the jacket.

Figure 6:
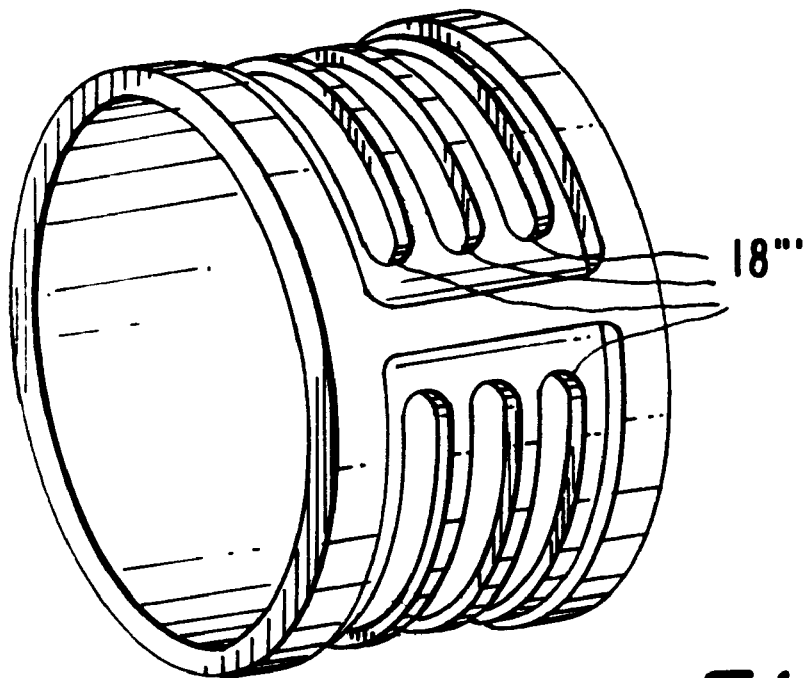
FIG. 6 is a view showing the cooling jacket in accordance with still a further embodiment of the present invention.

FIG. 6 shows a cooling jacket having a plurality of cooling passages 18''' separated from one another by webs.

Figure 7:
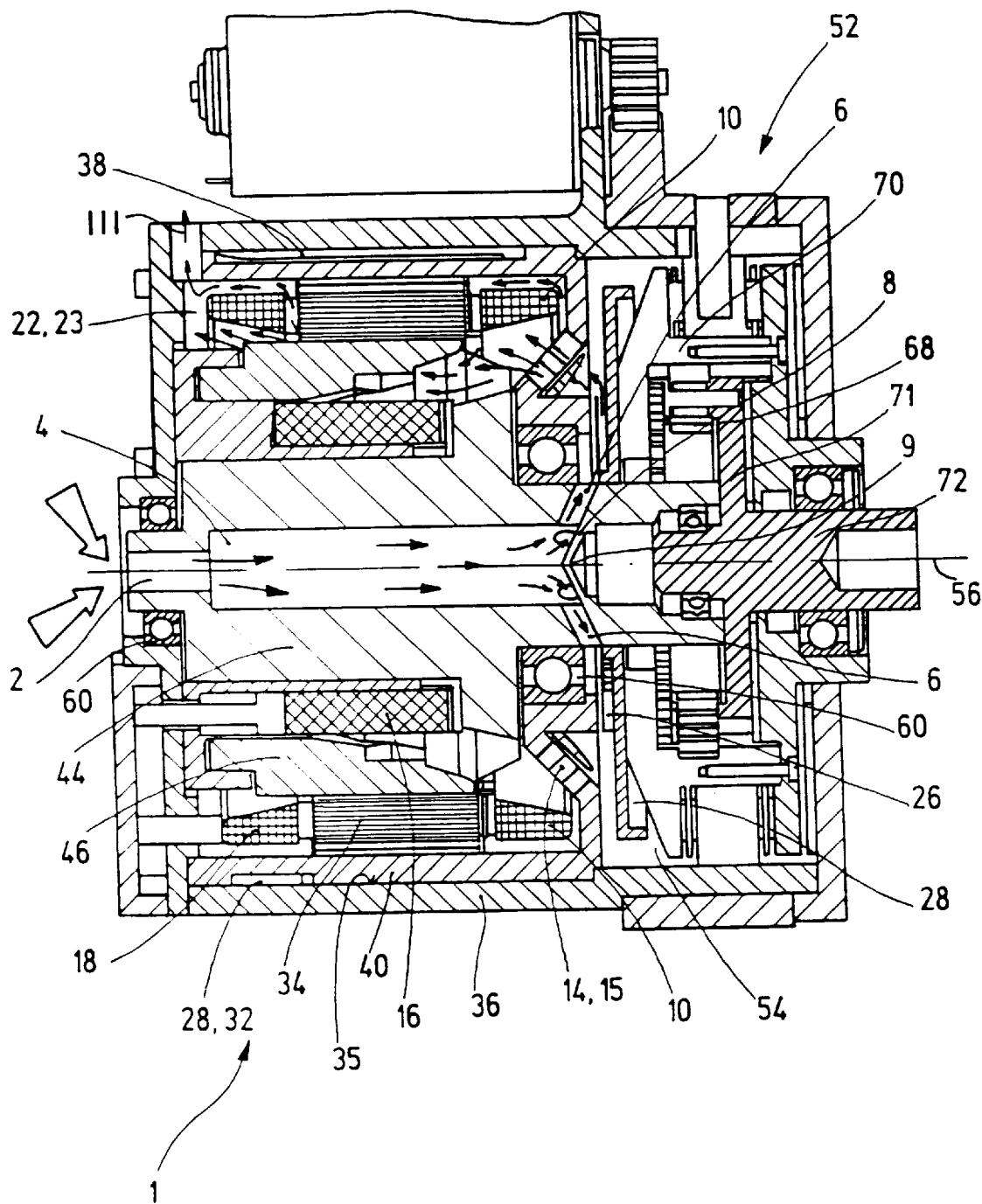
FIG. 7 is a view showing a further embodiment of the electrical machine in accordance with the present invention.

FIG. 7 shows an embodiment, in which the slots 110 of means for providing separate circulations with different cooling mediums for the stator and the rotor are replaced by peripheral openings 111.

It will be understood that each of the elements described above, or two or more together, may also find a useful application in other types of constructions differing from the types described above.

While the invention has been illustrated and described as embodied in electrical machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electrical machine for starting an internal combustion engine and/or for voltage supply of a vehicle electrical system of a motor vehicle, comprising a housing; a stator mounted on said housing; a claw pole rotor systems, a separable operative connection for connecting the machine with an internal combustion engine; and means for providing separate circulations with different cooling media for said stator and said rotor, said means including an opening provided in said rotor centrally and closed by a positive guiding element so as to guide a circulating air.

2. An electrical machine as defined in claim 1, wherein said positive guiding element is formed as a closing plug with a conical tip located on said rotary axis of a rotor.

3. An electrical machine as defined in claim 2; and further comprising a further positive guiding element formed as an impulse wheel with a plurality of vanes.

4. An electrical machine as defined in claim 3, wherein said further positive guiding element has a rotatable air guiding plate.

5. An electrical machine for starting an internal combustion engine and/or for voltage supply of a vehicle electrical system of a motor vehicle, comprising a housing; a stator mounted on said housing; a claw pole rotor systems, a separable operative connection for connecting the machine with an internal combustion engine; and means for providing separate circulations with different cooling media for said stator and said rotor, said means forming a closed air circulation.

6. An electrical machine for starting an internal combustion engine and/or for voltage supply of a vehicle electrical system of a motor vehicle, comprising a housing; a stator mounted on said housing; a claw pole rotor; a separable operative connection for connecting the machine with an internal combustion engine; and means for providing separate circulations with different cooling media for said stator and said rotor, said means including an air cooling of said rotor by an air circulation, said air cooling of said rotor being provided by a central air guide and a plurality of radial transverse openings formed in said rotor, said rotor having a shaft, said central air guide being formed as a single central opening extending from one end of said shaft.

* * * * *